US011899771B2

(12) United States Patent
Kennedy-Foster (10) Patent No.: US 11,899,771 B2
(45) Date of Patent: Feb. 13, 2024

(54) SPACE DETERMINATION WITH BOUNDARY VISUALIZATION

(71) Applicant: CARRIER CORPORATION, Palm Beach Gardens, FL (US)

(72) Inventor: Ashley Kennedy-Foster, Henrietta, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/059,917

(22) PCT Filed: Sep. 5, 2019

(86) PCT No.: PCT/US2019/049720
§ 371 (c)(1),
(2) Date: Nov. 30, 2020

(87) PCT Pub. No.: WO2020/055660
PCT Pub. Date: Mar. 19, 2020

(65) Prior Publication Data
US 2021/0209213 A1    Jul. 8, 2021

Related U.S. Application Data

(60) Provisional application No. 62/730,665, filed on Sep. 13, 2018.

(51) Int. Cl.
*G06F 21/00*    (2013.01)
*G06F 21/35*    (2013.01)
(Continued)

(52) U.S. Cl.
CPC .............. *G06F 21/35* (2013.01); *G06V 20/52* (2022.01); *G08B 13/19682* (2013.01)

(58) Field of Classification Search
CPC .... G06F 21/35; G08B 13/19682; G06V 20/52
See application file for complete search history.

(56) References Cited

U.S. PATENT DOCUMENTS 6,633,232 B2    10/2003    Trajkovic et al.
7,457,436 B2    11/2008    Paragios et al.
(Continued)

FOREIGN PATENT DOCUMENTS

| CN | 105094080 A | 11/2015 |
|---|---|---|
| CN | 106384027 A | 2/2017 |
| EP | 3163521 A1 | 5/2017 |

OTHER PUBLICATIONS

International Search Report for International Application No. PCT/US2019/049720, International Filing Date Sep. 5, 2019, dated Nov. 19, 2019, 6 pages.
(Continued)

*Primary Examiner* — Joseph P Hirl
*Assistant Examiner* — Chi D Nguy
(74) *Attorney, Agent, or Firm* — CANTOR COLBURN LLP (57) ABSTRACT

A computer-implemented method includes assigning each access device of a plurality of access devices to at least one respective space of a plurality of spaces, including assigning a first access device to a first space of the plurality of spaces, based on the first access device controlling access to the first space. One or more access devices, from among the plurality of access devices, that are assigned to the first space are grouped together into a first group of devices. A boundary of the first space is generated based at least in part on access data generated by the first group of devices, where the access data describes access to the first space by way of the one or more access devices in the first group of devices.

10 Claims, 9 Drawing Sheets

(51) Int. Cl.
*G08B 13/196* (2006.01)
*G06V 20/52* (2022.01)

(56) References Cited

U.S. PATENT DOCUMENTS

| | | | |
|---|---|---|---|
| 8,350,908 | B2 | 1/2013 | Morris et al. |
| 8,836,580 | B2 | 9/2014 | Mendelson |
| 9,113,309 | B2 | 8/2015 | Uilecan et al. |
| 9,121,931 | B2 | 9/2015 | Xu et al. |
| 9,396,385 | B2 | 7/2016 | Bentley et al. |
| 9,429,927 | B2 | 8/2016 | Nesler |
| 9,699,603 | B2 | 7/2017 | Shen et al. |
| 9,730,029 | B2 | 8/2017 | Choudhury et al. |
| 9,863,773 | B2 | 1/2018 | Jiang et al. |
| 11,553,320 | B1 * | 1/2023 | Hutz ............... H04L 12/2803 |
| 2002/0168084 | A1 | 11/2002 | Trajkovic et al. |
| 2009/0315678 | A1 | 12/2009 | Padmanabhan et al. |
| 2010/0322516 | A1 | 12/2010 | Xu et al. |
| 2012/0092492 | A1 | 4/2012 | Carbonell et al. |
| 2016/0050396 | A1 * | 2/2016 | Gali ..................... H04N 7/181 |
| | | | 348/159 |
| 2016/0094951 | A1 | 3/2016 | Yang et al. |
| 2017/0090441 | A1 | 3/2017 | Schmitt et al. |
| 2017/0243472 | A1 * | 8/2017 | Davies ............... G08B 25/009 |
| 2017/0372223 | A1 | 12/2017 | Vaughn et al. |
| 2018/0004178 | A1 | 1/2018 | Haines et al. |
| 2018/0176755 | A1 | 6/2018 | Zhao |
| 2019/0347366 | A1 * | 11/2019 | Krylov ................. G06F 30/20 |

OTHER PUBLICATIONS

Written Opinion for International Application No. PCT/US2019/049720, International Filing Date Sep. 5, 2019, dated Nov. 19, 2019, 8 pages.

Girgensohn, Andreas, et al., "Determining Activity Patterns in Retail Spaces through Video Analysis", MM'08, Oct. 26-31, 2008, 4 pages.

Chinese Office Action for Application No. 201980041004.5; dated May 27, 2022; 12 Pages.

* cited by examiner

FIG. 1

| SPACES | | 3 DEVICES UNASSIGNED | 5 PEOPLE UNASSIGNED | |
|---|---|---|---|---|
| TYPE | SPACE | DEVICES | PEOPLE | ISSUES |
| AREA | LOBBY | 7 | 45 | ⊘ |
| BUILDING | CORPORATE HEADQUARTERS | 32 | 45 | ⊘ |
| FLOOR | FIRST FLOOR | 12 | 45 | ⊘ |
| LOT | MAIN PARKING LOT | 4 | 45 | ⊘ |
| AREA | MAINTENANCE ENTRANCE | 0 | 3 | ⊘ |
| BUILDING | SATELLITE OFFICE | 5 | 12 | ⊘ |
| FLOOR | SECOND FLOOR | 7 | 24 | 1 |
| AREA | VICE PRESIDENT'S OFFICE | 2 | 0 | ⊘ |
| SITE | CORPORATE CAMPUS | 12 | 45 | ⊘ |

SPACE DETERMINATION WITH BOUNDARY VISUALIZATION

CROSS REFERENCE TO RELATED APPLICATIONS

This application is a National Stage application of PCT/US2019/049720, filed Sep. 5, 2019, which claims the benefit of U.S. Provisional Application No. 62/730,665, filed Sep. 13, 2018, both of which are incorporated by reference in their entirety herein.

BACKGROUND

Embodiments pertain to the art of access control and, more particularly, to space determination with boundary visualization.

Access control refers to controlling or tracking movements through physical areas. Access control generally uses various types of hardware devices, including access devices, video devices, and intrusion devices. An access device allows a person to access an area, a video device records video within an area, and an intrusion device detects unauthorized intrusion into an area. Generally, these hardware devices are organized into groups based on device type only. For instance, there is likely to be a distinct group for access devices, another for video devices, and yet another for intrusion devices. Each group performs a specific type of monitoring. For instance, if access devices are grouped together, then personnel assigned to that group may monitor access assignments and access activity.

BRIEF DESCRIPTION

Disclosed is a computer-implemented method for space determination. A non-limiting example of the computer-implemented method includes assigning each access device of a plurality of access devices to at least one respective space of a plurality of spaces, including assigning a first access device to a first space of the plurality of spaces, based on the first access device controlling access to the first space. One or more access devices, from among the plurality of access devices, that are assigned to the first space are grouped together into a first group of devices. A boundary of the first space is generated based at least in part on access data generated by the first group of devices, where the access data describes access to the first space by way of the one or more access devices in the first group of devices.

Also disclosed is a system for space determination. A non-limiting example of the system includes a memory having computer-readable instructions and one or more processors for executing the computer-readable instructions. The computer-readable instructions include assigning each access device of a plurality of access devices to at least one respective space of a plurality of spaces, including assigning a first access device to a first space of the plurality of spaces, based on the first access device controlling access to the first space. Further according to the computer-readable instructions, one or more access devices, from among the plurality of access devices, that are assigned to the first space are grouped together into a first group of devices. A boundary of the first space is generated based at least in part on access data generated by the first group of devices, where the access data describes access to the first space by way of the one or more access devices in the first group of devices.

Also disclosed is a computer-program product for space determination, the computer-program product including a computer-readable storage medium having program instructions embodied therewith. The program instructions are executable by a processor to cause the processor to perform a method. A non-limiting example of the method includes assigning each access device of a plurality of access devices to at least one respective space of a plurality of spaces, including assigning a first access device to a first space of the plurality of spaces, based on the first access device controlling access to the first space. Further according to the method, one or more access devices, from among the plurality of access devices, that are assigned to the first space are grouped together into a first group of devices. A boundary of the first space is generated based at least in part on access data generated by the first group of devices, where the access data describes access to the first space by way of the one or more access devices in the first group of devices.

In addition to one or more of the features described above, or as an alternative to any of the foregoing embodiments, a relationship is detected between the first space and a second space separated from the first space by the first access device, based at least in part on the access data.

In addition to one or more of the features described above, or as an alternative to any of the foregoing embodiments, each camera device of a plurality of camera devices is assigned to at least one respective space of the plurality of spaces, including assigning a first camera device to the first space, based at least in part on a proximity of the first camera device to the first space.

In addition to one or more of the features described above, or as an alternative to any of the foregoing embodiments, each intrusion device of a plurality of intrusion devices is assigned to at least one respective space of the plurality of spaces, including assigning a first intrusion device to the first space, based at least in part on a proximity of the first intrusion device to the first space.

In addition to one or more of the features described above, or as an alternative to any of the foregoing embodiments, one or more camera devices in the plurality of camera devices that are assigned to the first space and one or more intrusion devices in the plurality of intrusion devices that are assigned to the first space are grouped together, into the first group of devices.

In addition to one or more of the features described above, or as an alternative to any of the foregoing embodiments, a visualization is generated in which the first space is associated with the first group of devices, where the first group of devices includes at least the first access device, the first camera device, and the first intrusion device.

In addition to one or more of the features described above, or as an alternative to any of the foregoing embodiments, an anomaly is detected related to at least one device in the first group of devices. An alert is issued in the visualization, where the alert is associated with the first space, based on the first group of devices being associated with the first space.

In addition to one or more of the features described above, or as an alternative to any of the foregoing embodiments, a presence of a first user is detected in the first space. It is determined that the presence of the first user in the first space is an anomaly, based at least in part on a history of access to the first space by the first user.

In addition to one or more of the features described above, or as an alternative to any of the foregoing embodiments, the detecting the presence of the first user in the first space includes analyzing two or more of access data generated by the first group of devices, camera data generated by the first group of devices, and intrusion data generated by the first group of devices.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
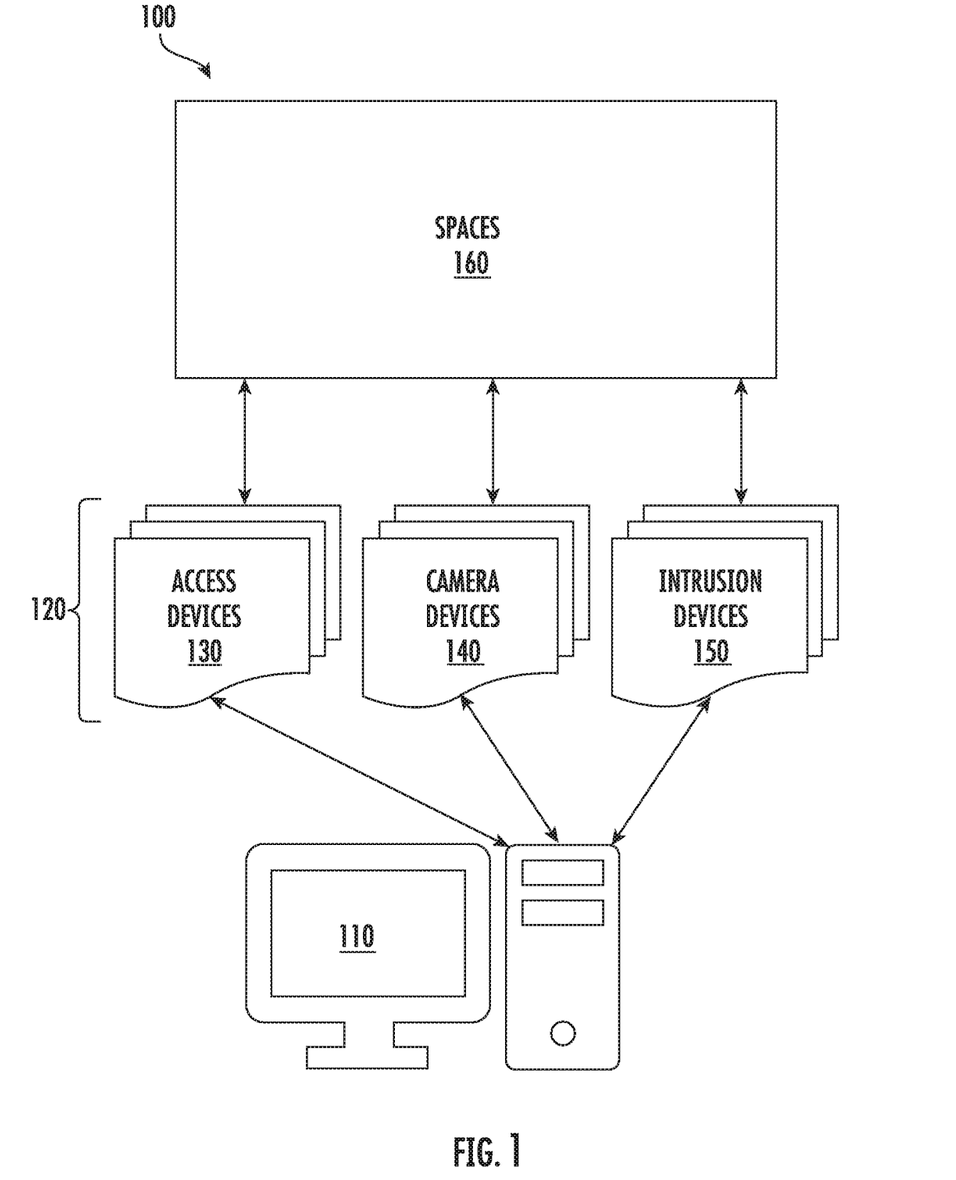
FIG. 1 is a diagram of a security system, according to some embodiments.

FIG. 1 is a diagram of a security system 100, according to some embodiments. As shown, the security system 100 may include an administration portal 110 and one or more devices 120, which may include a set of access devices 130, a set of camera devices 140, and a set of intrusion devices 150. As discussed in detail below, each device 120 may be assigned to one or more spaces being monitored by the security system 100.

Administration of these various devices 120 may occur through the administration portal 110, which may generate security alerts and information about traffic flows, and which may enable a user to manage the access devices 130, camera devices 140, and intrusion devices 150, as well as the security system 100 as a whole. Generally, the administration portal 110 may provide centralized processing for the security system 100. Specifically, information provided through the administration portal 110 may be in the form of visualizations that relate to spaces 160, as discussed in detail below. The access devices 130, camera devices 140, and intrusion devices 150 may each be in direct or indirect communication with the administration portal 110. For example, and not by way of limitation, the administration portal 110 may be or may execute on a computer system, and each of such devices 120 may be in communication with that computer system over a wired or wireless connection. Thus, due to the communication between the devices 120 and the administration portal 110, an administrator may manage the devices 120 through the administration portal 110, and the administration portal 110 may detect issues related to the devices 120.

The set of access devices 130 may include one or more access devices 130, each of which may be a reader that detects the presence of authorized users and enables access to authorized users. For example, and not by way of limitation, access devices 130 may include keycard readers and radio-frequency identification (RFID) readers. Further, each access device 130 may control a door, gate, or other divider, such that the access device 130 may control when the door, gate, or other divider opens for a user. Each access device 130 may be classified as an entry reader, an exit reader, or a bidirectional reader, and each access device 130 may be associated with a space whose entry or exit, or both, is controlled by the access device 130. An entry reader may control entry into a space 160, an exit reader may control exit from the space 160, and a bidirectional reader may protect both entry into and exit from the space 160. It will be understood that, in some cases, a one-way access device 130 (i.e., controlling entrance or exit for a particular space 160, but not both) may provide entry into a first space 160 as well as exit into a second space 160, where the first space 160 is adjacent to the second space. In that case, it may be an arbitrary choice whether to classify the access device 130 as an entry reader or an exit reader. Classification of an access device 130 may be performed manually or automatically. For instance, an administrator may specify the classification of an access device 130 to the administration portal 110, or the access device 130 may identify itself, including an indication of its classification, to the administration portal 110.

Each access device 130 may detect the presence, and potentially an identity, of a proximate user and may provide or deny access based on an identity of the user. The presence and identity of a user may be detected in various ways, depending at least in part on the type of access device 130. For instance, if the access device 130 is a keycard reader, then the user may place a keycard within range of the access device 130. The keycard may be assigned to a user and may thus indicate the identity of the user to the access device 130 when read by the access device 130. If the user is authorized to access the space 160 protected by the access device 130, then the access device 130 may allow access to the user. For instance, to determine whether the user is authorized, the access device 130 may communicate with the administration portal 110, which may attempt to match the user's identity to the set of users assigned to the space 160. Additionally or alternatively, the access device 130 may have local knowledge of authorized users and may therefore determine locally whether the user is authorized. In either case, however, the access device 130 may transmit the user's identity to the administration portal 110, such that the security system 100 can monitor users who have attempted access to the space 160, whether authorized or not.

In some embodiments, each access device 130 generates access data. This access data may describe, for example, attempts to use the access device 130 to enter or exit a space 160 as well as which attempts were from authorized users and which were not. The access devices 130 may communicate their respective access data to the administration portal 110, which may aggregate the access data together as a whole or with respect to assigned spaces 160.

The set of camera devices 140 may include one or more camera devices 140, such as still cameras or video cameras, each of which may capture images of monitored spaces. In some embodiments, the security system 100 may utilize facial recognition to recognize the faces of those in various spaces 160 monitored by the security system 100, and this facial recognition may be facilitated by the use of the camera devices 140. For instance, a camera device 140 may transmit captured images to the administration portal 110. The administration portal 110 may run facial recognition on the captured images. The administration portal 110 may therefore track which users are in which spaces 160 and when, based in part on the camera devices 140. If the person is not recognized as a user who is authorized for the space 160 in which an image was captured, then the security system 100 may issue an alert.

In some embodiments, each camera device 140 generates camera data. This camera data may include, for example, still and moving images captured by the camera device 140. The camera devices 140 may communicate their respective camera data to the administration portal 110, which may aggregate the camera data together as a whole or with respect to assigned spaces 160.

The set of intrusion devices 150 may include one or more devices 120 that detect unauthorized intrusions (e.g., access other than by way of the access devices 130). These intrusion devices 150 may include, for example, glass-break sensors, motion detectors, or occupancy detectors. Each intrusion device 150 may communicate each detected intrusion to the administration portal 110 as intrusion data. The administration portal 110 may aggregate the intrusion data together as a whole or with respect to assigned spaces 160.

As discussed above, conventional security systems segment hardware devices into groups based on hardware type. This conventional organizational method for security hardware leads to redundant groups of hardware that are used for disparate purposes. Further, traditional device organization does not track or leverage the fact that access devices 130 control the flow of traffic between physical areas. According to some embodiments, however, security devices 120 used to administer or monitor the security system 100 are unified. This unification allows security data, which may include access data, camera data, and intrusion data, to be correlated by proximity and managed by the concept of spaces 160. Some embodiments enable the administration and visualization of boundaries between physical spaces 160, which may allow the security system 100 to leverage traffic flow of authorized users into information that makes security more efficient and effective. According to some embodiments, boundary monitoring combined with camera data and intrusion data, as filtered by the concept of spaces 160, creates new active and passive monitoring opportunities.

Figure 2:
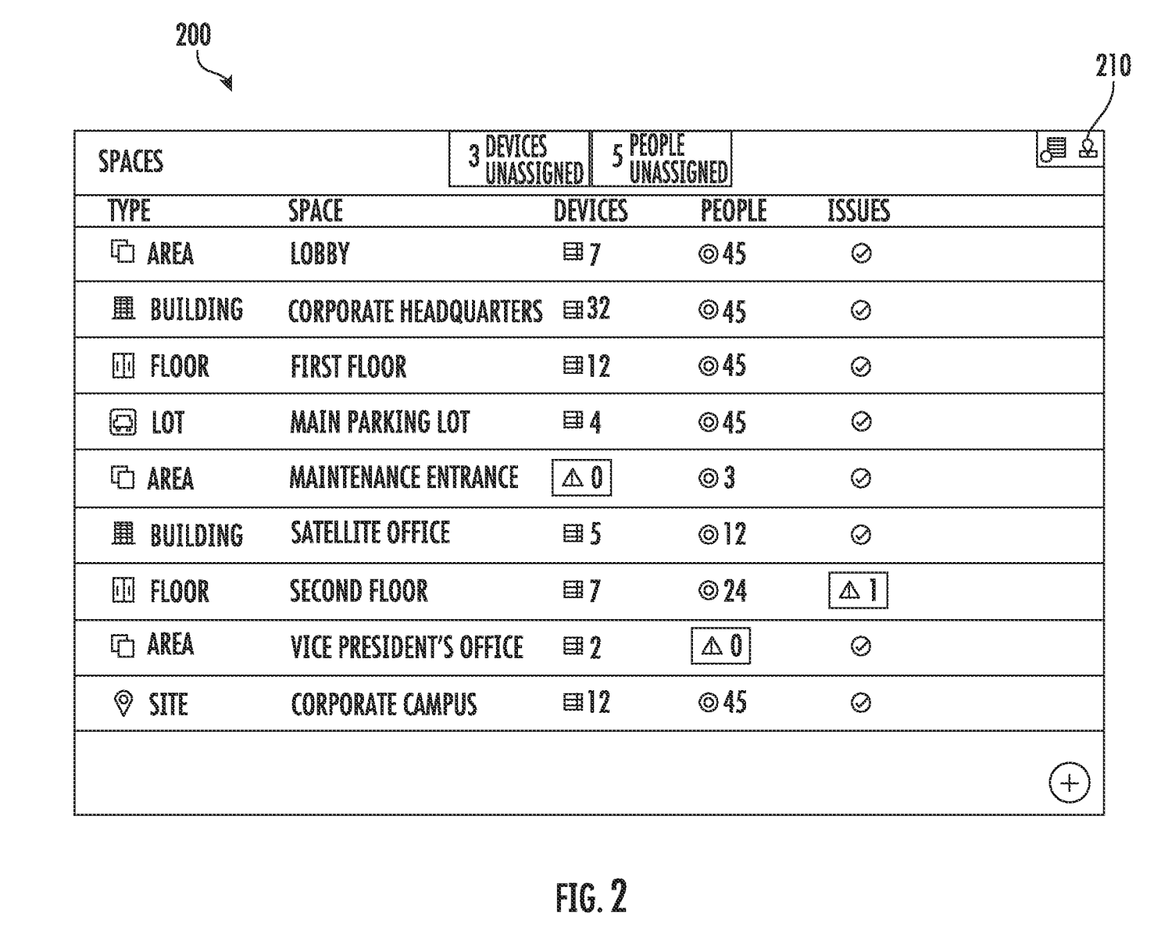
FIG. 2 is a first visualization generated at an administration portal of the security system, showing management alerts with respect to spaces, according to some embodiments.

FIG. 2 is a first visualization 200 generated at an administration portal 110 of the security system 100, showing management alerts with respect to spaces 160, according to some embodiments. In some embodiments, the administration portal 110 may provide one or more visualizations through which the user can view spaces 160 and manage the security system 100.

In this first visualization 200, in the upper left corner, the administration portal 110 provides a switcher 210 that enables a user to switch between available visualizations. The first visualization 200, illustrated in FIG. 2, is a list view and presents the user with a list of spaces 160 being monitored by the security system 100. In some embodiments, the spaces are named manually, but as described below, boundaries and thus spaces 160 themselves may be automatically detected in some respects. In this example, the spaces 160 include a lobby, corporate headquarters, first floor, main parking lot, maintenance entrance, satellite office, second floor, vice president's office, and corporate campus. It will be understood, however, that a combination of these and other spaces may exist within a secure location.

Each space may be assigned to a type, or category, selected from among a set of available categories. For example, and not by way of limitation, the available space types may be one or more of the following: area, building, floor, and parking lot. The available categories may be system-defined, user-defined, or a combination of both. Further, assigning a space to a category may be performed by a user or automatically by the security system 100. For example, and not by way of limitation, the security system may automatically assign a space type to a space based on historical assignments or default assignments. For instance, if a lobby was previously assigned to an area type, then when a new lobby space is identified, the security system 100 may automatically assign the new lobby space to the area type as well.

In the first visualization 200, each space 160 is represented by a row of a table. As shown in the example of FIG. 2, the respective row of a space 160 may include an indication of the space type, devices 120 assigned to the space 160, people authorized to enter the space 160, and issues currently associated with the space 160. Specifically, the row representing a space 160 may include the number of devices 120 assigned to the space 160, the number of people authorized to enter the space 160, and the number of issues currently in the space. In this example, as shown in FIG. 2, the number of devices 120 assigned to the lobby is seven, which is indicated on the row represented the lobby; the number of people authorized to enter the lobby is forty-five, which is indicated on the row representing the lobby; and the number of issues, if any, in the lobby is also indicated on the row representing the lobby.

Generally, each device 120 may be assigned to one or more spaces 160, and for each space 160, the devices 120 thereto assigned may be arranged into a group. Devices 120 can be assigned to a space in various ways. For example, and not by way of limitation, a user may manually assign a device 120 to a space 160, or the security system 100. Automatic assignment may occur, for example, based on detecting that the device 120 is associated the space 160, such as by being contained within the space 160, by monitoring the space 160, by providing entry to or exit from the space 160, or by being located proximate the space 160.

The administration portal 110 may issue an alert when there is an anomaly, or unexpected occurrence, regarding devices 120. For instance, as shown in the example of FIG. 2, there are no devices 120 being tracked that are assigned to the maintenance entrance, and as such an alert is issued. In this example, the alert appears as a warning on the row of the interface representing the space 160, specifically the maintenance entrance. Further, the administration portal 110 may issue an alert when a device 120 is not assigned to any space 160. For instance, in the example of FIG. 2, three devices 120 are unassigned, and a warning to that effect is shown at the top center of the first visualization 200.

Each user known to the security system 100 may be authorized for zero, one, or more spaces 160. For instance, a user may become known to the security system 100 when an administrator creates a security profile for the user. A security profile may indicate the spaces 160 for which the user is authorized. In some embodiments, the various device 120 may be updated when a user's security profile is created or updated, to operate properly with respect to the user. For example, if a user is authorized to access is a first space 160, then the administration portal 110 may communicate with the devices 120 assigned to the first space 160 to provide that access. Each access device 130 providing entry to the first space 160 may be updated to allow access to the user.

The administration portal 110 may issue an alert when there is an anomaly, or unexpected occurrence, regarding a user. For instance, as shown in the example of FIG. 2, there are no users assigned to the vice president's office. As a result, in some embodiments, there can be no authorized entry into the vice president's office. An alert may be issued to warn of this. In this example, the alert appears as a warning on the row of the first visualization 200 representing the vice president's office.

Additionally or alternatively to the above, the administration portal 110 may issue an alert when other anomalies arise. For instance, in the example of FIG. 2, a warning icon is shown in the issues column on the row representing the second floor. The anomaly causing this warning may be of various types. In some embodiments, the column for devices 120 and people is reserved for anomalies indicating that no devices 120 or no people, respectively, are assigned to a space 160, while the issues column is for anomalies other than these. In this case, for example, the anomaly associated with the second floor may be that a keycard reader is nonfunctional, or that a face was detected where that face is not recognized as belonging to a person authorized for the space.

In some embodiments, the security system 100 may be capable of predictive assumptions, due in part to the unification of devices 120 and the concept of spaces 160. For example, if a user usually obtains access to a first space 160 at a certain time of a weekday, and if at that time on a particular weekday, the user instead attempts access to a second space 160, the security system may treat this as an anomaly. In this case, the user's past access to the first space may have been recorded as access data by a first access device 130 providing entry into the first space, or as camera data by a first camera device 140 capturing images in or around the first space 160. Analogously, the user's attempted access to the second space may be recorded by a second access device 130 or a second camera device 140. The security system 100 may issue an alert in this case, and that alert may be associated with the first space 160, the second space 160, or both. Further, the alert may be displayed in association with one or more both of these spaces 160 in the first visualization 200. In some embodiments, the security system 100 may prevent access to the second space 160 due to the anomaly, even though the user may be generally authorized to access the second space 160. In some embodiments, each anomaly may be assigned a threat level (e.g., low, medium, high), and in that case anomalies having at least a threshold threat level may lead to access being denied.

Figure 3:
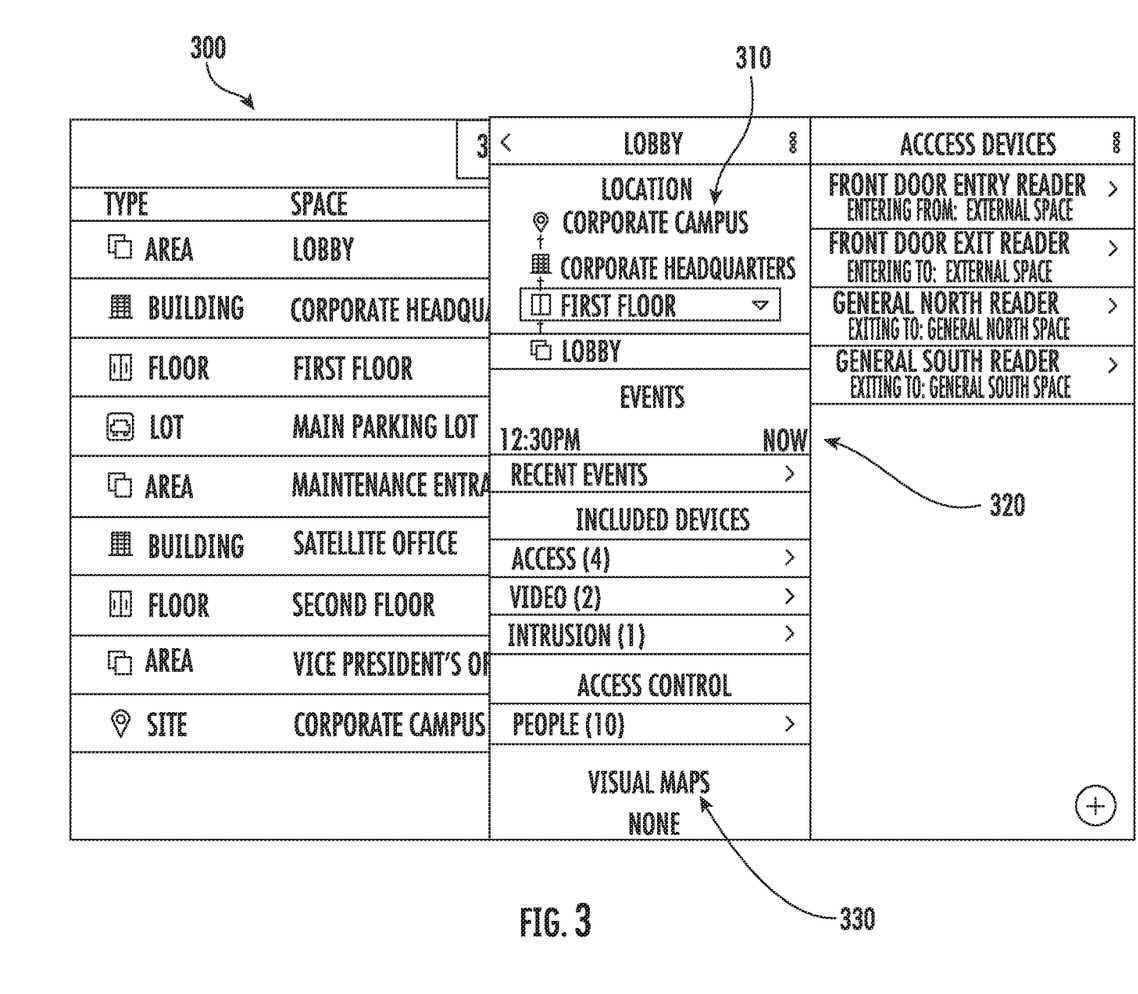
FIG. 3 is a second visualization generated at the administration portal of the security system, showing details of a selected space, according to some embodiments.

FIG. 3 is a second visualization 300 generated at the administration portal 110 of the security system 100, showing details of a selected space 160, according to some embodiments. In this second visualization 300, an administrator has selected the lobby, and thus, the administration portal 110 presents additional information related to this space 160. The security system 100 may maintain a hierarchy 310 of spaces, such that each space may exist within another space. In this example, as details are shown for the lobby, the placement of the lobby within the hierarchy 310 is also shown. Specifically, as shown in FIG. 3, the lobby is within the first floor, which is within the corporate headquarters, which is within the corporate campus.

The security system 100 may maintain a record of events for each space 160, where each event is detected by one of the devices 120 in relation to the space 160 in question. For example, and not by way of limitation, with respect to a first space 160, each attempt to access the first space 160 may be an event, each authorized access into the space 160 may be deemed an event, each authorized exit from the space 160 may be deemed and event, each detection of a face by a camera device 140 may be deemed an event, and each detected intrusion may be deemed an event. It will be understood by one skilled in the art that many other events are possible and may be detected and recorded by the security system 100. An event timeline 320 may be generated for each space 160, such that the event timeline 320 is a timeline of events associated with the space 160. As shown in FIG. 3, the event timeline 320 may be shown in the details of the space 160. The details shown may also include the devices 120 assigned to the space 160 as well as the classification of each such device 120 or an indication of an adjacent space 160 to which the access device 130 connects the space 160 in question. Additionally or alternatively, the details shown may include an indication of the users assigned to the space 160. If a floorplan or other map 330 is available to describe the space, then the details may include a link to such a floor plan or other map 330.

Figure 4:
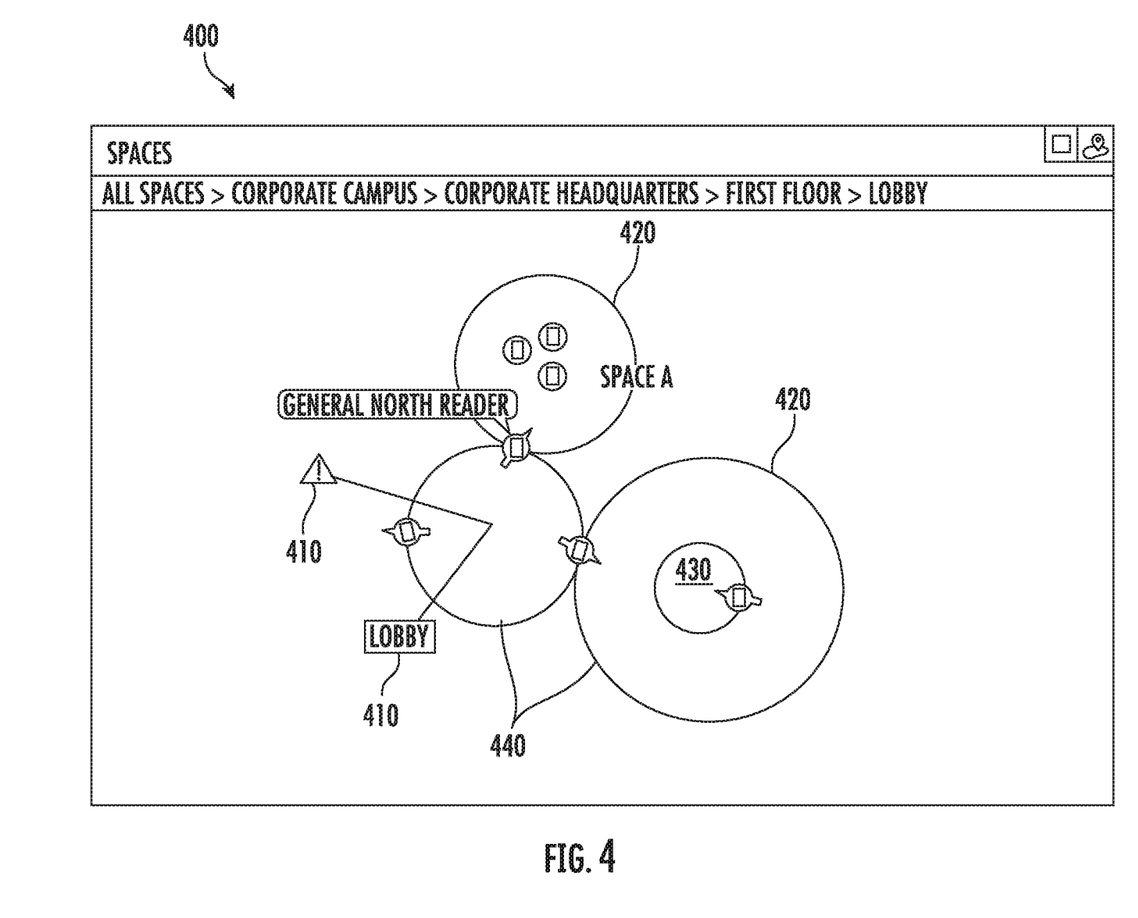
FIG. 4 is a third visualization generated at the administration portal of the security system, showing an abstract view of spaces, according to some embodiments.

FIG. 4 is a third visualization 400 generated at the administration portal 110 of the security system 100, showing an abstract view of spaces 160, according to some embodiments. This third visualization 400 may illustrate where the spaces 160 displayed fall within a hierarchy 310 of spaces 160 being monitored. Further, as shown in FIG. 4, the visualization may include labeling 410, which may provide details about a space 160, such as the name of the space 160 or the existence of alerts.

The security system 100 may be able to detect various details about the locations of access devices 130, the sizes of spaces 160, or both. For instance, in some embodiments, one or more of the devices 120 include geolocation, such that the security system 100 can detect their locations in real space. Additionally or alternatively, in some embodiments, each user may carry a keycard or other detectable device. Such detectable devices 120 may incorporate locators, enabling the security system 100 to track the movements of users through the various spaces 160. In that case, the position of a user when the user uses an access device 130 or is detected by a camera device 140 may indicate the location of the access device 130 or the camera device 140, if such devices 120 are lacking geolocation. Thus, whether geolocation is incorporated in devices 120 or not, the security system 100 may be enabled to determine locations of the security devices 120. However, the security system 100 need not know the locations of walls or other room separators. The example third visualization 400 of FIG. 4 thus illustrates a view provided by the administration portal 110 based on knowledge of locations of the access devices 130, without knowledge of walls.

In the third visualization of FIG. 4, a boundary 420 of each space 160 is demarcated by a circle. In some embodiments, as shown, the circles representing various spaces 160 may vary in size. In this case, the size of a circle representing a space 160 may be based on, for example, actual detected size or the number of devices 120 grouped together in association with the space 160. The actual size of a space 160 may be detected, for example, based on locations of users while they are in the space 160 if user locations are being tracked.

The security system 100 may determine the types of boundaries 420 between spaces tracked by the security system 100. This determination may be made based on explicit information provided by an administrator or based on detected data, or based on a combination of both. More specifically, for example, determination of boundary types may be based on information about the type of each access device 130. Upon setting up an access device 130 in the security system 100, an administrator may specify the type of the access device 130 and, in the case of a one-way reader, the direction in which traffic is controlled. Each access device 130 may act as a boundary 420 between spaces 160, or may float within a space 160. An access device 130 acts as a one-reader boundary 420 when it is a one-way reader that controls traffic in only one direction. This may be the case, for instance, if a door has a keycard reader on one side, to control entry into a space 160, but users are free to exit without having to go through a keycard reader. In that case, the keycard reader may act as a one-reader boundary 420. Analogously, a two-reader boundary 420 is an access device 130 that controls traffic in both directions. In some embodiments, the security system 100 may also keep track of doors that do not act as security boundaries (i.e., have no associated access device 130). In the example third visualization 400 of FIG. 4, three of such doors are illustrated within Space A. Because these doors do not act as boundaries 420, the security system 100 may be unable to automatically detect the boundaries 420 of rooms associated with these doors. However, the lack of access devices 130 on these doors suggests that no tracking is desired with respect to such rooms specifically.

Based at least in part on the types of boundaries 420 between spaces 160, the security system 100 may determine relationships of spaces to one another. For example, a child space 430, or a parented space, may be a space 160 that is entered from a second space 160 and also exits to that same second space 160, such that a one-reader boundary controls entrance into the child space 430. An example child space 430 is shown in FIG. 4. Sibling spaces 440 are adjacent spaces 160, where there is no determination that one such space 160 includes the other. Example sibling spaces 160 are shown in FIG. 4 as well. The security system 100 may detect these relationships based on access data, for example.

Figure 5:
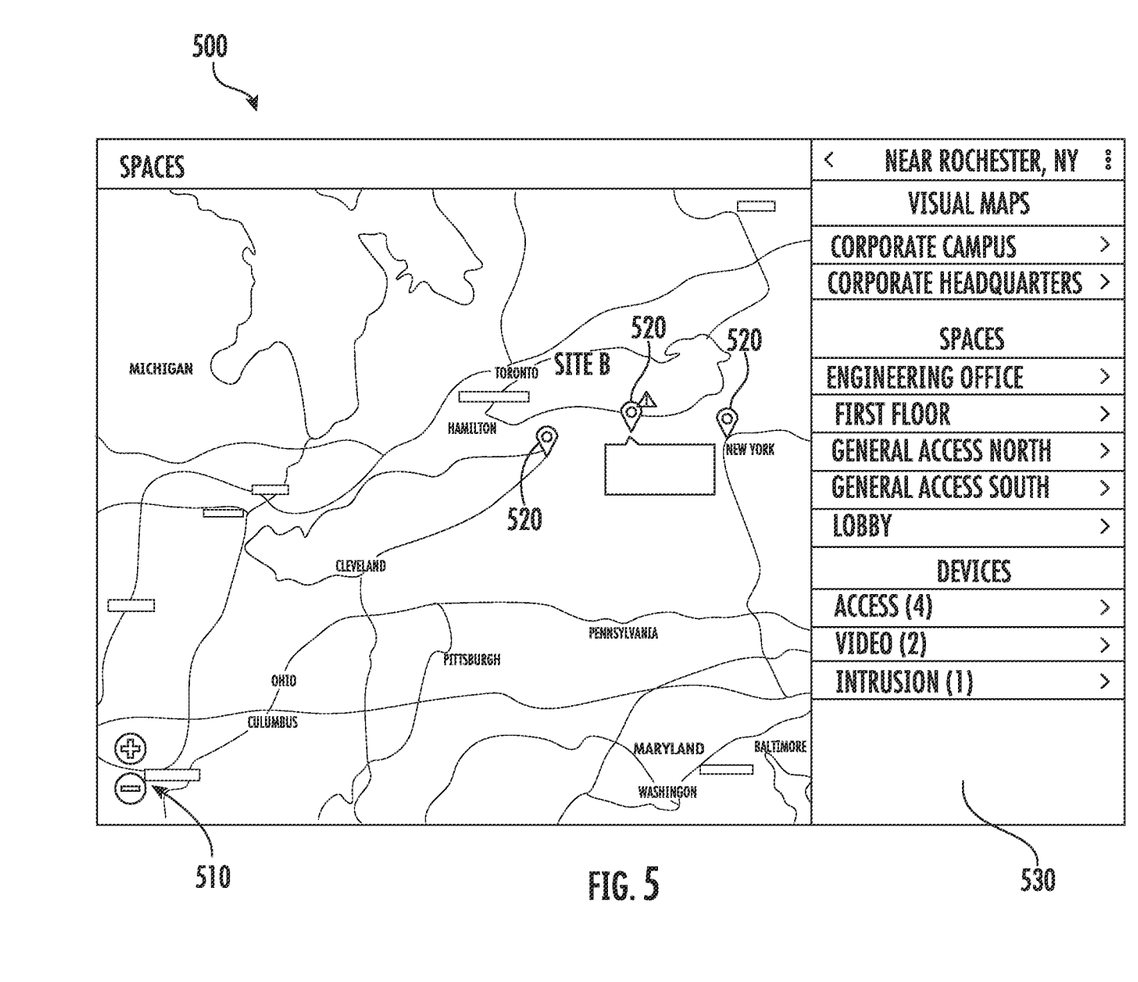
FIG. 5 is a fourth visualization generated at the administration portal of the security system, showing spaces in the context of a geographical map, according to some embodiments.

FIG. 5 is a fourth visualization 500 generated at the administration portal 110 of the security system 100, showing spaces 160 in the context of a geographical map 330, according to some embodiments. The map 330 may include zoom controls 510, useable to modify the magnification level and thereby view information about spaces 160 in more or less detail. The lower the magnification, the wider the view. In this case, the relatively low magnification, as compared to the visualizations in FIGS. 2-4, enables the display of three sites 520 being monitored. Each site 520 may include various spaces 160, each with assigned devices 120, such as access devices 130, camera devices 140, and intrusion devices 150. In this wide view of the sites 520, information about devices 120 and alerts may be aggregated for each site 520. For instance, in this example, Site B has been selected by an administrator, and information about Site B is thus being displayed in a panel 530.

Regarding Site B, there is a warning associated with at least one space 160 within that site 520. There are additionally two visual maps 330, thirty geolocated devices 120, and five spaces 160 within the site 520. Aggregated details about these maps 330, devices 120, and spaces 160 are displayed in the panel 530, due to the administrator's selection of Site B. If the administrator wishes to see details at a finer level, the administrator can select a map 330, a space 160, or a device 120, and the administration portal 110 may then present such finer details.

Figure 6:
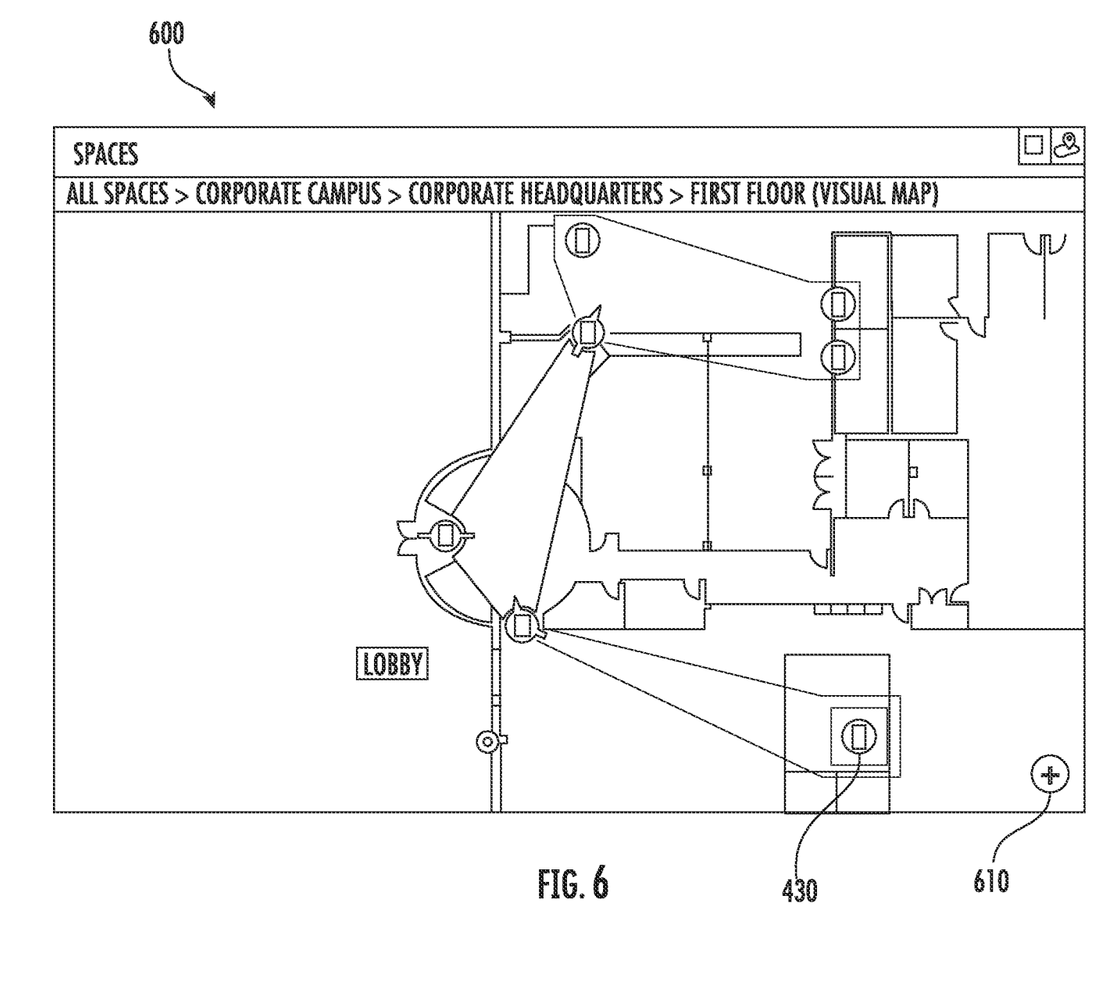
FIG. 6 is a fifth visualization generated at the administration portal of the security system, showing spaces in the context of a floorplan, according to some embodiments.

FIG. 6 is a fifth visualization 600 generated at the administration portal 110 of the security system 100, showing spaces 160 in the context of a floorplan, according to some embodiments. In some embodiments, the security system 100 can automatically generate estimated boundaries 420 for a space 160, where an estimated boundary 420 is a prediction of true boundary 420 (e.g., physical walls). This example fifth visualization 600 illustrates such boundaries 420.

A boundary 420 may be determined based on various data generated by or provided to the security system 100. For instance, as discussed above, the security system 100 may have access to the geolocations of each device 120. Further, the security system 100 may detect users' routes through the spaces 160, based on access devices 130 used, facial recognition used on images captured by the camera devices 140, or other data. With this information, the security system 100 may determine how access devices 130 relate to one another. For instance, if a user uses a first access device 130, and the next access device 130 used by the user is a second access device 130, then it may be assumed that the first access device 130 leads into a space 160 that can be exited by way of the second access device 130. Further, the locations of the first and second access device 130 may thus indicate edges of the space 160. As a result of such deduction, the security system 100 may predict boundaries 420 that connect access devices 130 and thereby demarcate a space 160, as shown in the fifth visualization 600 of FIG. 6. In the case of a child space 430, the location of a boundary 420 may not be known, except that the child space 430 is contained within a parent space 160. Thus, as shown in FIG. 6, this may be illustrated by showing a boundary 420 of the child space 430 inside a boundary of its parent space 160.

As discussed above, the security system 100 may maintain one or more maps 330, including floorplans, for example. The security system 100 may receive from an administrator a geolocation associated with a key position on a floorplan. As such, that geolocation may be used to determine the relative locations of various devices 120 within the floorplan, based on the geolocations of the devices 120 in relation to the geolocation of the key position. As such, various devices 120 may be associated with respective positions on the floorplan. Additionally, an administrator may relocate a device 120 on the floorplan to correct any inaccuracies resulted from detected positions.

From the floorplan, an administrator may add additional devices 120 to be tracked by the security system 100. For example, the fifth visualization 600 may include an addition button 610, which the administrator can select to add a device 120. A device 120 can thus be added to the floorplan even when the geolocation of the device 120 is not known or automatically detectable. The administrator may select a point on the floorplan to indicate where the device 120 is located within the floorplan. Based on the point selected for the new device 120, and based on the respective geolocations of other device 120 positioned within the floorplan, the security system 100 may determine a geolocation of the new device 120 as well.

Figure 7:
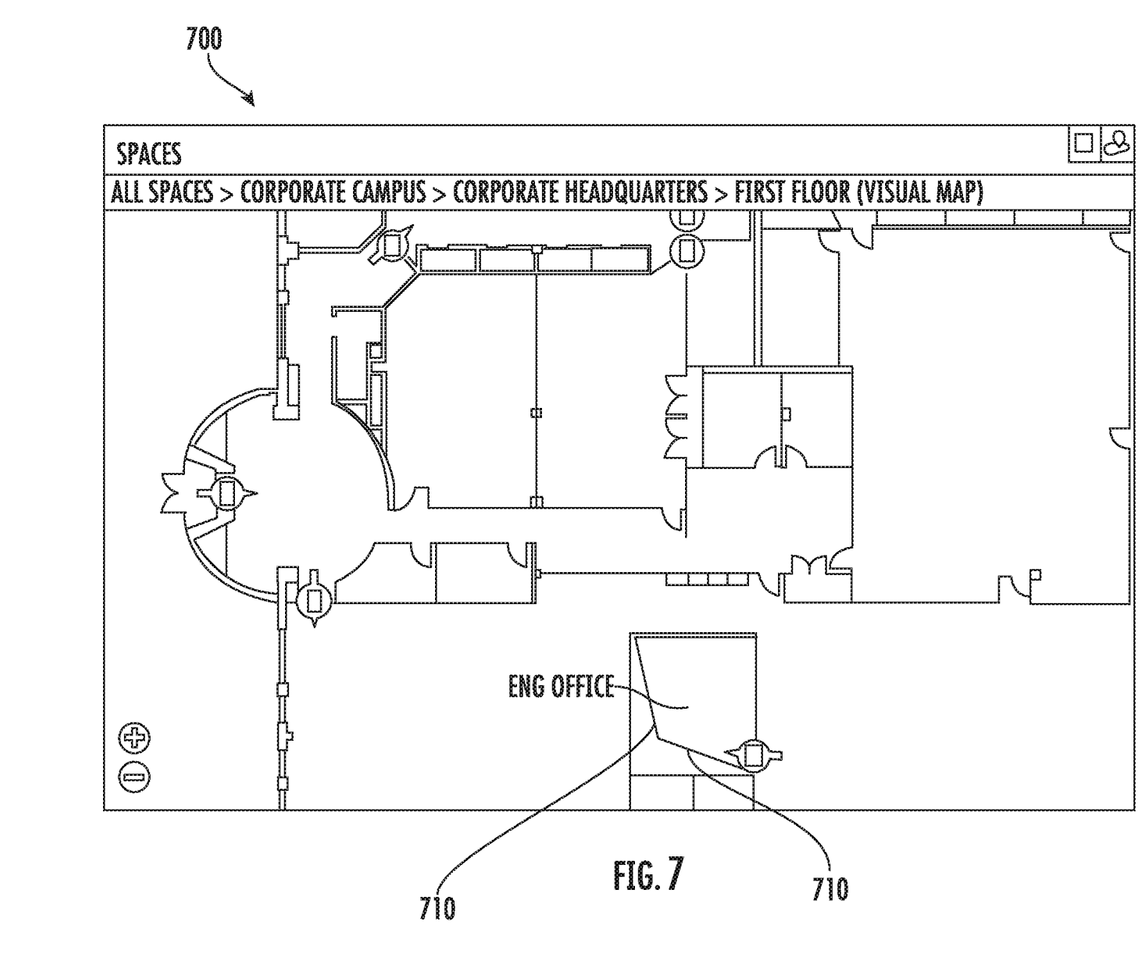
FIG. 7 is a sixth visualization generated at the administration portal of the security system, showing the modification of predicted boundaries, according to some embodiments.

FIG. 7 is a sixth visualization 700 generated at the administration portal 110 of the security system 100, showing the modification of predicted boundaries 420, according to some embodiments. As shown in FIG. 7, the security system 100 may enable an administrator to adjust a boundary 420. Boundaries 420 determined automatically may be useful but may not be entirely accurate, because walls may not be detectable by the security system 100. However, accuracy of device layout within a floorplan can be improved by allowing the administrator to make adjustments, such as by moving access devices 130 and adjusting boundaries 420. As shown, the sixth visualization 700 may provide a handle 710, which an administrator can drag to adjust the boundary 420 of a space 160. The security system 100 may automatically provide such a handle 710 at the corners of each boundary 420. However, the security system 100 may also allow the administrator to select a point on the boundary 420 so as to request a new handle 710, and as such, the security system 100 may provide the new handle 710 at the selected point. The administrator may use the new handle 710, potentially in conjunction with other handles 710, to adjust the boundary 420 to more accurately reflect the nature of the associated space 160.

Figure 8:
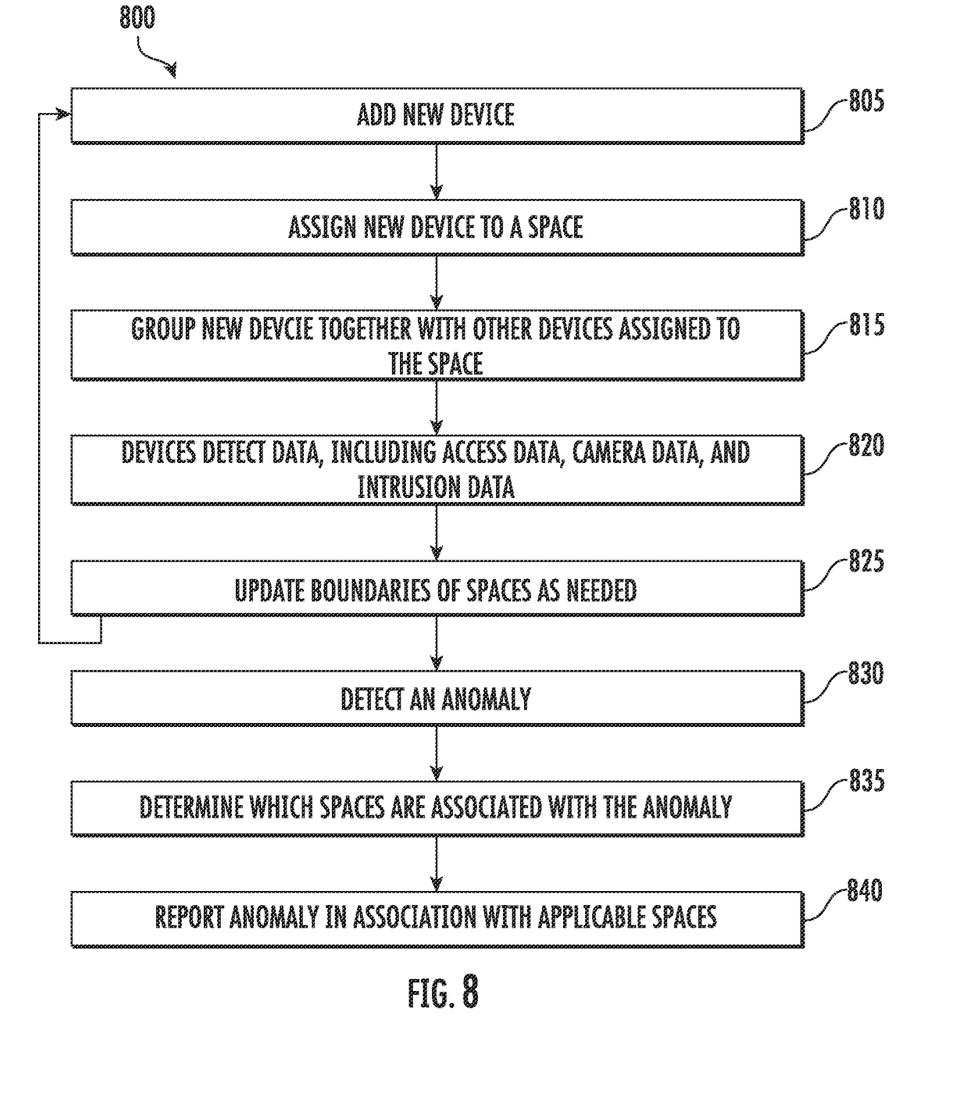
FIG. 8 is a flow diagram of a method of monitoring spaces with the security system 100, according to some embodiments.

FIG. 8 is a flow diagram of a method 800 for monitoring spaces 160 with the security system 100, according to some embodiments. It will be understood by one skilled in the art that FIG. 8 shows what may be only a subset of the security system's functionality. This method 800 is provided for illustrative purposes only and does not limit the scope of methods performable by the security system 100.

At block 805, a new device 120 may be added to the security system 100. This device 120 may be, for example, an access device 130, a camera device 140, or an intrusion device. At block 810, the new device 120 may be assigned to a space 160 of a plurality of spaces monitored by the security system 100. Selection of the space 160 to which the new device 120 is assigned may be performed manually or automatically. If performed automatically, the selection may be based in part on proximity of the new device 120 to the selected space 160, for example. At block 815, the new device 120 may be grouped together with other devices 120 assigned to the selected space 160. At block 820, the new device may join existing devices 120 in detecting data associated to the security system 100. In some cases, addition of a new device 120 may modify automatically determined boundaries 420 of spaces 160. For instance, if the new device 120 is a new access device 130, then traffic flow through the new access device 130 may affect predicted boundaries 420. Thus, at block 825, boundaries 420 may be updated as needed. Block 805 through block 825 may be repeated each time a new device 120 is added to the security system 100.

At block 830, an anomaly may be detected, where an anomaly may be an occurrence that is unexpected based on historical data combined from the various devices 120, which may include access data, camera data, or intrusion data. At block 835, it may be determined which one or more spaces 160 are associated with the anomaly. For example, and not by way of limitation, if the anomaly was detected in part due to data generated by a first device 120, then the space 160 to which the first device 120 is assigned may be deemed associated with the anomaly. At block 840, the anomaly may be reported in an alert associated with the space 160. For example, and not by way of limitation, the alert may appear proximate a representation of the space 160 appearing in a visualization.

Figure 9:
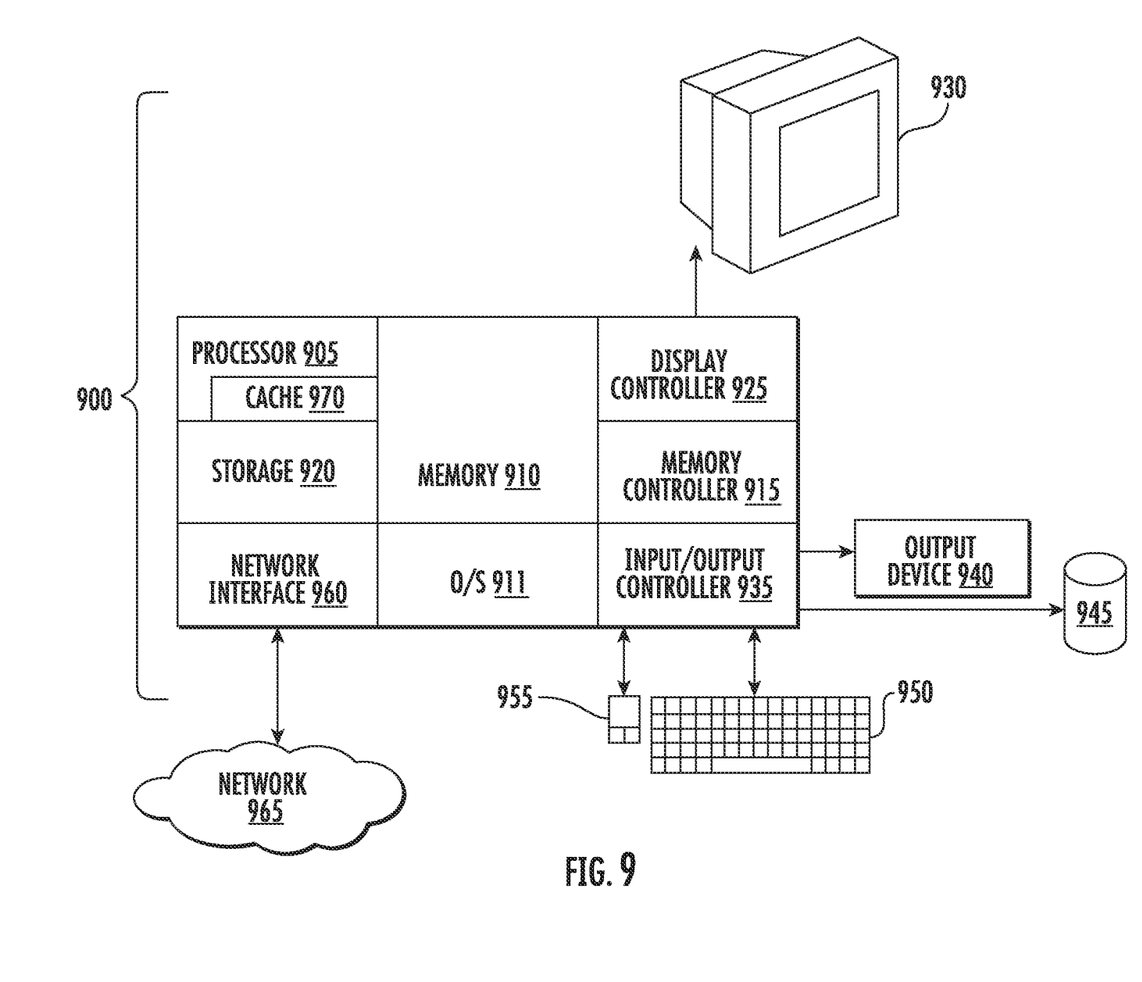
FIG. 9 is a diagram of a computer system for implementing some or all aspects of the security system, according to some embodiments.

FIG. 9 is a block diagram of a computer system 900 for implementing some or all aspects of the security system 100, according to some embodiments. The security systems 100 and methods described herein may be implemented in hardware, software (e.g., firmware), or a combination thereof. In some embodiments, the methods described may be implemented, at least in part, in hardware and may be part of the microprocessor of a special or general-purpose computer system 900, such as a personal computer, workstation, minicomputer, or mainframe computer. For example, and not by way of limitation, the administration portal 110 may be implemented as a computer system 900 or may run on a computer system 900.

In some embodiments, as shown in FIG. 9, the computer system 900 includes a processor 905, memory 910 coupled to a memory controller 915, and one or more input devices 945 and/or output devices 940, such as peripherals, that are communicatively coupled via a local I/O controller 935. These devices 940 and 945 may include, for example, a printer, a scanner, a microphone, and the like. Input devices such as a conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 940, 945 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 910. The processor 905 may be a custom made or commercially available processor, a central processing unit (CPU), an auxiliary processor among several processors associated with the computer system 900, a semiconductor-based microprocessor (in the form of a microchip or chip set), a macroprocessor, or other device for executing instructions. The processor 905 includes a cache 970, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 970 may be organized as a hierarchy of more cache levels (L1, L2, etc.).

The memory 910 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 910 may incorporate electronic, magnetic, optical, or other types of storage media. Note that the memory 910 may have a distributed architecture, where various components are situated remote from one another but may be accessed by the processor 905.

The instructions in memory 910 may include one or more separate programs, each of which comprises an ordered listing of executable instructions for implementing logical functions. In the example of FIG. 9, the instructions in the memory 910 include a suitable operating system (OS) 911. The operating system 911 essentially may control the execution of other computer programs and provides scheduling, input-output control, file and data management, memory management, and communication control and related services.

Additional data, including, for example, instructions for the processor 905 or other retrievable information, may be stored in storage 920, which may be a storage device such as a hard disk drive or solid-state drive. The stored instructions in memory 910 or in storage 920 may include those enabling the processor to execute one or more aspects of the security systems 100 and methods of this disclosure.

The computer system 900 may further include a display controller 925 coupled to a display 930. In some embodiments, the computer system 900 may further include a network interface 960 for coupling to a network 965. The network 965 may be an IP-based network for communication between the computer system 900 and an external server, client and the like via a broadband connection. The network 965 transmits and receives data between the computer system 900 and external systems. In some embodiments, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Security systems 100 and methods according to this disclosure may be embodied, in whole or in part, in computer program products or in computer systems 900, such as that illustrated in FIG. 9.

As described in detail above, embodiments of the security system 100 unify various types of devices 120 and also group devices 120 together into spaces 160. As a result, detected data from access devices 130, camera devices 140, and intrusion devices 150 may be used together to make predictive assumptions and to provide useful visualizations organized based on spaces 160. This organization based on spaces may enable a human administrator to better understand how devices 120 work together and what issues need to be addressed.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method comprising:
    assigning each access device of a plurality of access devices to at least one respective space of a plurality of spaces, wherein the assigning each access device comprises assigning a first access device to a first space of the plurality of spaces, based on the first access device controlling access to the first space;
    grouping together, into a first group of devices, one or more access devices in the plurality of access devices that are assigned to the first space;
    generating a boundary of the first space based at least in part on access data generated by the first group of devices, wherein the access data describes access to the first space by way of the one or more access devices in the first group of devices;
    assigning each camera device of a plurality of camera devices to at least one respective space of the plurality of spaces, wherein the assigning each camera device comprises assigning a first camera device to the first space, based at least in part on a proximity of the first camera device to the first space;
    assigning each intrusion device of a plurality of intrusion devices to at least one respective space of the plurality of spaces, wherein the assigning each intrusion device comprises assigning a first intrusion device to the first space, based at least in part on a proximity of the first intrusion device to the first space;
    grouping together, into the first group of devices, one or more camera devices in the plurality of camera devices that are assigned to the first space and one or more intrusion devices in the plurality of intrusion devices that are assigned to the first space;
    generating a visualization in which the first space is depicted as associated with the first group of devices, comprising at least the first access device, the first camera device, and the first intrusion device;
    wherein the one or more access devices provides or denies access to the first space based on an identity of the user.

2. The computer-implemented method of claim 1, further comprising detecting a relationship between the first space and a second space separated from the first space by the first access device, based at least in part on the access data.

3. The computer-implemented method of claim 1, further comprising:
    detecting an anomaly related to at least one device in the first group of devices; and
    issuing an alert in the visualization, wherein the alert is associated with the first space, based on the first group of devices being associated with the first space.

4. The computer-implemented method of claim 1, further comprising:
    detecting a presence of a first user in the first space; and
    determining that the presence of the first user in the first space is an anomaly, based at least in part on a history of access to the first space by the first user.

5. The computer-implemented method of claim 4, wherein the detecting the presence of the first user in the first space comprises analyzing two or more of the access data generated by the first group of devices, camera data generated by the first group of devices, and intrusion data generated by the first group of devices.

6. A system comprising:
a memory having computer-readable instructions; and
one or more processors for executing the computer-readable instructions, the computer-readable instructions comprising:
  assigning each access device of a plurality of access devices to at least one respective space of a plurality of spaces, wherein the assigning each access device comprises assigning a first access device to a first space of the plurality of spaces, based on the first access device controlling access to the first space;
  grouping together, into a first group of devices, one or more access devices in the plurality of access devices that are assigned to the first space;
  generating a boundary of the first space based at least in part on access data generated by the first group of devices, wherein the access data describes access to the first space by way of the one or more access devices in the first group of devices;
  assigning each camera device of a plurality of camera devices to at least one respective space of the plurality of spaces, wherein the assigning each camera device comprises assigning a first camera device to the first space, based at least in part on a proximity of the first camera device to the first space;
  assigning each intrusion device of a plurality of intrusion devices to at least one respective space of the plurality of spaces, wherein the assigning each intrusion device comprises assigning a first intrusion device to the first space, based at least in part on a proximity of the first intrusion device to the first space;
  grouping together, into the first group of devices, one or more camera devices in the plurality of camera devices that are assigned to the first space and one or more intrusion devices in the plurality of intrusion devices that are assigned to the first space;
  generating a visualization in which the first space is depicted as associated with the first group of devices, comprising at least the first access device, the first camera device, and the first intrusion device;
  wherein the one or more access devices provides or denies access to the first space based on an identity of the user.

7. The system of claim 6, the computer-readable instructions further comprising:
  detecting an anomaly related to at least one device in the first group of devices; and
  issuing an alert in the visualization, wherein the alert is associated with the first space, based on the first group of devices being associated with the first space.

8. A computer-program product for space determination, the computer-program product comprising a non-transitory computer-readable storage medium having program instructions embodied therewith, the program instructions executable by a processor to cause the processor to perform a method comprising:
  assigning each access device of a plurality of access devices to at least one respective space of a plurality of spaces, wherein the assigning each access device comprises assigning a first access device to a first space of the plurality of spaces, based on the first access device controlling access to the first space;
  grouping together, into a first group of devices, one or more access devices in the plurality of access devices that are assigned to the first space;
  generating a boundary of the first space based at least in part on access data generated by the first group of devices, wherein the access data describes access to the first space by way of the one or more access devices in the first group of devices;
  assigning each camera device of a plurality of camera devices to at least one respective space of the plurality of spaces, wherein the assigning each camera device comprises assigning a first camera device to the first space, based at least in part on a proximity of the first camera device to the first space;
  assigning each intrusion device of a plurality of intrusion devices to at least one respective space of the plurality of spaces, wherein the assigning each intrusion device comprises assigning a first intrusion device to the first space, based at least in part on a proximity of the first intrusion device to the first space;
  grouping together, into the first group of devices, one or more camera devices in the plurality of camera devices that are assigned to the first space and one or more intrusion devices in the plurality of intrusion devices that are assigned to the first space;
  generating a visualization in which the first space is depicted as associated with the first group of devices, comprising at least the first access device, the first camera device, and the first intrusion device;
  wherein the one or more access devices provides or denies access to the first space based on an identity of the user.

9. The computer-program product of claim 8, the method further comprising detecting a relationship between the first space and a second space separated from the first space by the first access device, based at least in part on the access data.

10. The computer-program product of claim 8, the method further comprising:
  detecting an anomaly related to at least one device in the first group of devices; and
  issuing an alert in the visualization, wherein the alert is associated with the first space, based on the first group of devices being associated with the first space.

* * * * *